United States Patent [19]

Gogineni et al.

[11] 4,147,755

[45] Apr. 3, 1979

[54] AIR POLLUTION CONTROL PROCESS

[75] Inventors: Madanamohana R. Gogineni, Enfield; Philip C. Rader, Windsor Locks; Wilfred R. Roczniak, Enfield, all of Conn.

[73] Assignee: Combustion Engineering, Inc., Windsor, Conn.

[21] Appl. No.: 789,590

[22] Filed: Apr. 21, 1977

Related U.S. Application Data

[63] Continuation-in-part of Ser. No. 504,612, Sep. 9, 1974, abandoned.

[51] Int. Cl.² ............................................. C01B 17/00
[52] U.S. Cl. .................................................. 423/242
[58] Field of Search ................................. 423/242–244

[56] References Cited

U.S. PATENT DOCUMENTS

| | | | |
|---|---|---|---|
| 2,090,143 | 8/1937 | Non hebel et al. | 423/242 |
| 2,113,198 | 4/1938 | Non hebel et al. | 423/242 |
| 3,615,199 | 10/1971 | Terrana | 423/242 |

*Primary Examiner*—O. R. Vertiz
*Assistant Examiner*—Gregory A. Heller
*Attorney, Agent, or Firm*—Richard H. Berneike

[57] ABSTRACT

Gases containing $SO_2$ from a furnace are contacted in the scrubbing zone of a scrubber with an aqueous scrubbing medium containing $Ca(OH)_2$ whereby sulfites are formed. The $Ca(OH)_2$ additive is at least partially the $Ca(OH)_2$ sludge produced in the manufacture of acetylene from $CaC_2$. This sludge contains constituents which retard or inhibit the oxidation of sulfite to thereby reduce the possibility of sulfate scaling in the system.

3 Claims, 1 Drawing Figure

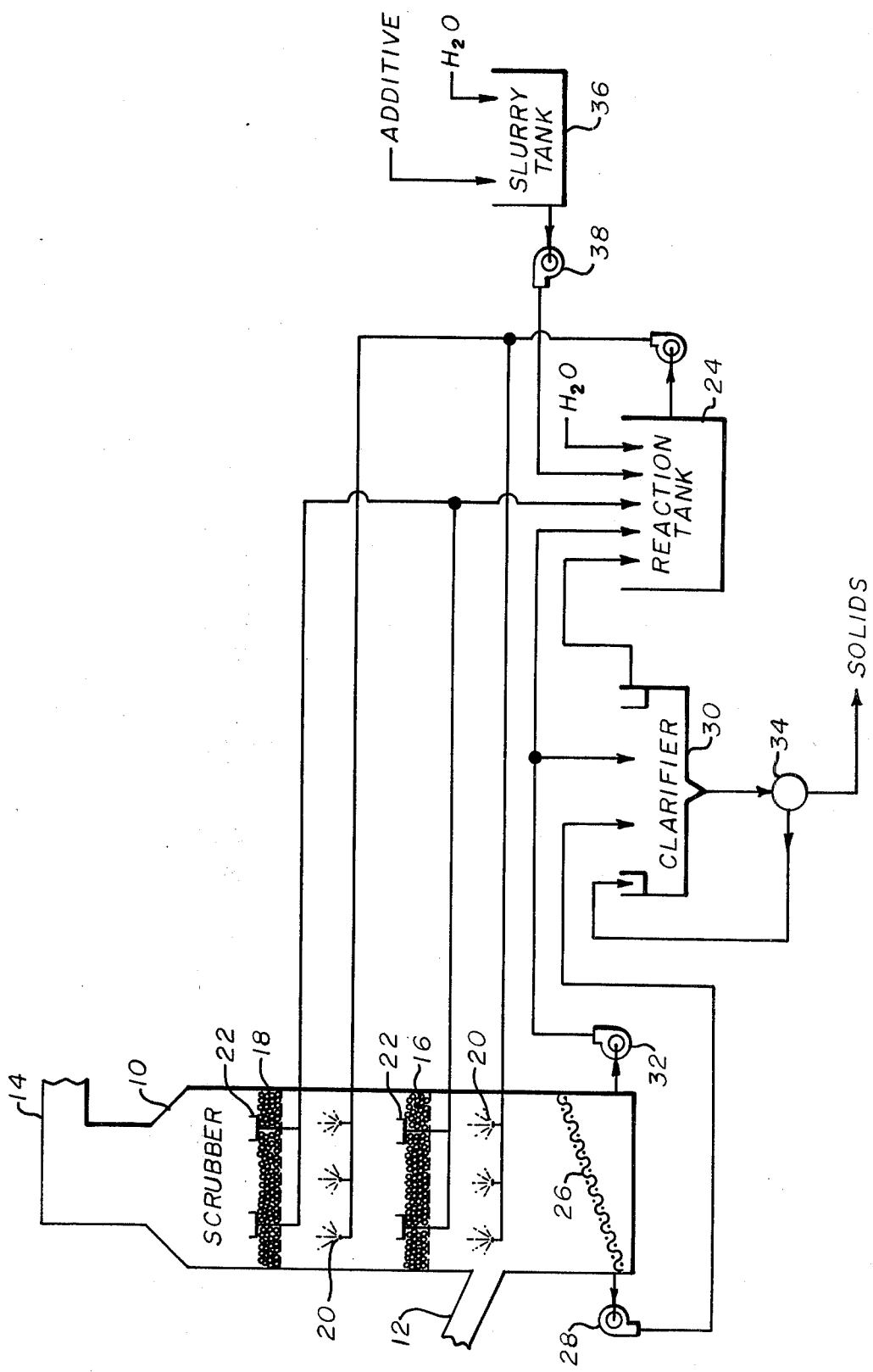

AIR POLLUTION CONTROL PROCESS

This application is a continuation-in-part of Applicant's copending Application Ser. No. 504,612 filed Sept. 9, 1974, now abandoned for AIR POLLUTION CONTROL PROCESS and assigned to the same assignee as the present invention.

BACKGROUND OF THE INVENTION

The discharge of the pollutants into the atmosphere has become of increasing concern as the rate of discharge increases and as the level of pollutants in the atmosphere increases. One of the sources of air pollution is the sulfur oxides and particulate matter which are discharged with the flue gases during the combustion of sulfur-containing fuels. A number of systems have been developed or proposed to remove the sulfur oxides and particulate matter from the flue gases. One of the first commercial systems involves scrubbing the flue gases with an aqueous medium which contains materials which will react with the sulfur oxides. The most commonly used additive materials for forming the aqueous scrubbing medium are limestone, dolomite, and slaked lime. A slurry of the additive material enters directly into a reaction tank and the scrubbing medium is then conveyed from the tank to spray nozzles in the scrubber. The incoming gas, laden with dust and $SO_2$ contacts the sprayed scrubbing medium in the scrubber. The $SO_2$ reacts with the additive to form sulfite. If extensive oxidation of the reactants takes place, the sulfite will be converted to sulfate which can cause serious scaling problems in the scrubber and associated piping and equipment. This is related to the tendency of this material to form extensively stable supersaturated solutions. Crystallization of the sulfate as gypsum, $CaSO_4 \cdot 2H_2O$, can occur on nucleation sites on the internal surfaces of the scrubber resulting in scale formation. One system for preventing this crystallization by nucleation and the resulting scaling is to provide sufficient seed crystals of the sulfate whereby the crystallization will take place by growth of the existing crystals. However, in order to minimize the chances to sulfate scaling, it is desirable to minimize the amount of oxidation of sulfite to sulfate.

SUMMARY OF THE INVENTION

The present invention relates to an air quality control system and more specifically to a system in which the gases containing sulfur oxides are scrubbed with an aqueous scrubbing medium containing calcium hydroxide whereby the sulfur oxides are reacted with the scrubbing medium to form sulfites. The invention involves the use of an additive which at least partially comprises the waste $Ca(OH)_2$ sludge produced in the manufacture of acetylene. This waste product, which comprises primarily $Ca(OH)_2$, contains constituents which retard or inhibit the oxidation of the sulfite.

BRIEF DESCRIPTION OF THE DRAWING

The drawing is a schematic flow diagram of the process of the present invention.

DESCRIPTION OF THE PREFERRED EMBODIMENTS

Referring to the drawing the flue gases containing $SO_2$ enter the scrubber 10 through the duct 12 and the cleaned gases exit through duct 14. The scrubber may be of the marble bed type as illustrated or any other suitable scrubber for liquid gas contact. The flue gases enter a region in the scrubber below the marble beds 16 and 18 where low energy, non-atomizing sprays 20 provide a constant supply of scrubbing medium to the undersides of the beds 16 and 18 and at the same time serve to adiabatically cool the flue gases to their saturation temperature prior to entering the marble beds 16 and 18. The wetted flue gases then enter the marble beds 16 and 18 in succession pulling the scrubbing medium with it. The vigorous agitation of the marbles mixes the flue gases with the scrubbing medium prior to their forming a turbulent layer above the marbles. The turbulent layer is supported by the pressure differential across the marble bed and the level of the turbulent layer is controlled by the height of overflow pots 22. It is in this region of turbulence that sufficient time and adequate mixing are provided to allow for the absorption of $SO_2$ and the removal of any particulate matter. Slurry which is rejected from below the upper marble bed 18 falls onto the lower marble bed 16 while slurry, which is rejected from below the lower marble bed 16, falls into the bottom of the scrubber. The slurry which leaves the marble beds through the overflow pots 22 is fed by gravity to the reaction tank 24. The slurry which is rejected from below the lower marble bed 16 falls onto a sloping screen 26 in the scrubber bottom. This screen catches any large particles which are purged periodically from the system through the pump 28 to the clarifier 30. The remainder of the rejected slurry is withdrawn from the scrubber bottom through pump 32. The major portion of this withdrawn slurry is returned to the reaction tank 24 but a small portion, perhaps about 6 percent, may be sent to the clarifier 30 in order to control solids in the scrubber system. The underflow from the clarifier 30 is fed to the vacuum filter system 34 where the solids are further dewatered. The cake from the vacuum filter system 34 is then disposed of while the filtrate is returned to the clarifier weir where it combines with clarifier supernatant and is recycled to the reaction tank 24 in order to maintain as completely a closed loop operation as possible.

The additive $Ca(OH)_2$ of the present invention, which will be further discussed hereinafter, is fed into the slurry tank 36 where it is mixed with water to form the additive slurry. This slurry is then fed as needed by the pump 38 into the reaction tank 24. The slurry in the reaction tank 24 is thus a mixture of the scrubber bottom slurry, effluent from the overflow pots 22, weir water from the clarifier 30, the additive slurry and make-up water. Mixers are used in the reaction tank 24 to insure that the various process streams are thoroughly mixed to allow for additive dissolution and calcium salt precipitation. From the reaction tank 24, the slurry is pumped to the underbed spray nozzles 20.

The essential reactions which take place in the scrubber are as follows:

$$Ca(OH)_2 + SO_2 \rightleftharpoons CaSO_3 + H_2O$$

$$CaSO_3 + SO_2 + H_2O \rightleftharpoons Ca(HSO_3)_2$$

$$Ca(HSO_3)_2 + Ca(OH)_2 \rightleftharpoons 2CaSO_3 + 2H_2O$$

$$CaCO_3 + SO_2 \rightleftharpoons CaSO_3 + CO_2$$

$$2CaSO_3 + O_2 \rightarrow 2CaSO_4$$

This latter reaction is the cause of the sulfate scaling problem and the reaction which is inhibited by the present invention. The $CaCO_3$ is present as an ingredient of the calcium hydroxide additive and is also formed by absorption of $CO_2$.

As indicated above, the calcium hydroxide additive for the present invention is a waste product from an acetylene plant. Acetylene is produced by the reaction of calcium carbide with water according to the following reaction:

$$CaC_2 + 2H_2O \rightarrow Ca(OH)_2 + C_2H_2$$

It is the $Ca(OH)_2$ sludge, otherwise known as carbide lime, that is produced according to this reaction that is used in the present invention. It would normally be expected that this $Ca(OH)_2$ sludge would function the same as hydrated commercial lime. However, it has been found that when the $Ca(OH)_2$ sludge from the acetylene process is used, the oxidation rate of the sulfite to sulfate in the system is greatly reduced. It has been determined that certain constituents in this sludge act as the oxidation inhibitor. Although the exact nature of the compound which is acting as the oxidation inhibitor is not known, certain aspects of the composition of the sludge are known. First of all the sludge contains small quantities, on the order of less than 0.005 percent, of organic constituents. The organic constituents which have been found in such sludges are long chain aliphatic hydrocarbons, phthalate esters, primary amides and polyols such as ethylene glycol. In addition to the types of compounds listed above, traces of other esters and alcohols have been detected.

Experimental bench scale tests for various ratios of carbide lime to hydrated commercial lime indicated that the oxidation rate remained constant until the hydrated commercial lime feed rate exceeded 90 percent of the additive feed rate. At this point, a significant increase in the amount of oxidation occurred. For example, these bench scale tests indicated that the oxidation rate with 100 percent hydrated commercial lime was on the order of 12 to 17 percent of the sulfite converted to sulfate. However, with 10 percent or more of the $Ca(OH)_2$ sludge included, the oxidation rate was less than 1 percent.

Pilot plant and full scale studies have confirmed the oxidation reduction observed in the bench scale studies although the amount of reduction has not been as dramatic. The results of the pilot plant studies are as follows expressed in weight percent:

| % Carbide Lime | 75 | 50 | 25 | 10 | 0 |
|---|---|---|---|---|---|
| % Hydrated Lime | 25 | 50 | 75 | 90 | 100 |
| % Ca | 30.3 | 30.7 | 31.0 | 30.8 | 29.1 |
| % $SO_3$ | 50.7 | 50.7 | 50.4 | 48.2 | 48.1 |
| % $SO_4$ | 2.7 | 3.4 | 3.8 | 5.0 | 5.8 |
| % $CaSO_3 \cdot \frac{1}{2} H_2O$ | 82.3 | 82.3 | 81.8 | 78.2 | 78.1 |
| % $CaSO_4 \cdot 2H_2O$ | 4.8 | 6.1 | 6.8 | 9.0 | 10.4 |
| % Oxidation | 4.5 | 6.0 | 6.0 | 7.7 | 9.1 |

It can be clearly seen from this data that there is a significant reduction in the amount of oxidation with even as little as 10 percent carbide lime and that the percent oxidation goes down as additional carbide lime is substituted for commercial hydrated lime.

The $Ca(OH)_2$ sludge from the acetylene plant may contain quantities of large particles such as ferro-silicon and calcium carbonate. If these materials are present in any substantial quantity, they can cause plugging problems in the system such as in slurry strainers. This problem is avoided if the large particles are removed from the sludge by some type of screening process or if the large particles are disintegrated or comminuted. For example, a vertical disintegrator may be used wherein the additive slurry has to pass through a set of screens while a set of hammers crush large particles through the screen. Any large particles which do not pass through the screen are collected separately from the slurry.

The additive slurry from the slurry tank 36 is transferred to the reaction tank 24 at a rate which is determined by the pH of the slurry coming from the reaction tank. This pH is measured and the slurry feed rate controlled to maintain a pH of 8.0 to 10.0, preferably 9.5. The feed rate of the scrubbing medium to the scrubber spray nozzles is controlled to obtain liquid-to-gas flow rate ratio of about 15 to 30.

What is claimed is:

1. A method of removing $SO_2$ from the flue gases produced in the combustion of sulfur-containing fuels comprising the steps of:
   a. providing a scrubbing medium, said scrubbing medium comprising a mixture of water and the $Ca(OH)_2$ sludge from an acetylene manufacturing process, said $Ca(OH)_2$ sludge containing at least one ingredient which inhibits the oxidation of sulfite to sulfate,
   b. contacting said flue gas in a scrubbing zone with said scrubbing medium whereby said $SO_2$ reacts with said scrubbing medium to form sulfite,
   c. withdrawing said scrubbing medium from said scrubbing zone,
   d. separating precipitated calcium sulfite from said withdrawn scrubbing medium, and
   e. recycling said scrubbing medium from step (d.) to step (a.) to form said scrubbing medium.

2. A method as recited in claim 1 wherein the pH of said scrubbing medium in step (a.) is maintained in the range of 8.0 to 10.0 by controlling the rate of addition of said $Ca(OH)_2$ sludge.

3. A method as recited in claim 1 wherein said scrubbing medium further includes hydrated lime and wherein said $Ca(OH)_2$ sludge comprises at least about 10 percent of the total of said $Ca(OH)_2$ sludge and said hydrated lime.